United States Patent [19]

Chan et al.

[11] Patent Number: 5,027,343
[45] Date of Patent: Jun. 25, 1991

[54] REMOTE TEST ACCESS SYSTEM FOR ISDN TESTING

[75] Inventors: Wing-Man Chan; Quoc H. Tu; Vithit Chungphaisan, all of Nepean, Canada

[73] Assignee: Northern Telecom Limited, Montreal, Canada

[21] Appl. No.: 386,625

[22] Filed: Jul. 31, 1989

[30] Foreign Application Priority Data

Apr. 21, 1989 [CA] Canada .................................. 597507

[51] Int. Cl.$^5$ .............................................. H04L 1/24
[52] U.S. Cl. .................................... 370/017; 370/60; 371/20.1
[58] Field of Search .................. 370/13, 17, 60, 85.13, 370/94.1, 58.1, 110.1; 371/20.1

[56] References Cited

U.S. PATENT DOCUMENTS

| | | | |
|---|---|---|---|
| 4,706,081 | 11/1987 | Hart et al. | 370/85.13 |
| 4,730,313 | 3/1988 | Stephenson et al. | 370/94.1 |
| 4,755,992 | 7/1988 | Albal | 370/94.1 |
| 4,792,753 | 12/1988 | Iwai | 370/13 |
| 4,893,307 | 1/1990 | McKay et al. | 370/94.1 |
| 4,905,231 | 2/1990 | Leung et al. | 370/94.1 |
| 4,910,729 | 3/1990 | Coffelt et al. | 370/17 |

Primary Examiner—Douglas W. Olms
Assistant Examiner—Melvin Marcelo
Attorney, Agent, or Firm—Michael M. Sakovich

[57] ABSTRACT

Conformance with established standards and interoperability between products in an integrated services digital network (ISDN) system defined by a layered hierarchy of interrelated protocols is ascertained by remotely testing the protocols between a tester in a local testing centre and a system under test located at a geographically removed site. The protocols tested relate to the first three layers of the system which are concerned mainly with the establishment, holding and release of a telecommunications path. Cost effectiveness in product testing is achieved by accessing both the tester and the system under test and communicating test procedures between the local and remote sites over a packet switching network to support testing at the remote site. Communications over a virtual circuit in the network are established between a pair of remote ISDN test access interfaces, one located at each site. A communications path from a test access interface and its corresponding local tester or system under test is provided by an ISDN interface. Under software control by a computer at each site, the test access interfaces function individually to split the corresponding ISDN interface so that the network may be inserted therebetween to link the tester with the system under test.

17 Claims, 10 Drawing Sheets

SUT = SYSTEM UNDER TEST

REMOTE TEST ACCESS SYSTEM FOR ISDN TESTING

FIELD OF THE INVENTION

This invention relates to apparatus and a method for conducting test procedures between a local terminal and a remote terminal of a telecommunications system defined by a layered hierarchy of interrelated protocols, and more particularly for testing system products to verify both conformance with established standards and interoperability of the products.

BACKGROUND OF THE INVENTION

One evolutionary trend in telephony is currently proceeding in the direction of integrated services digital networks (ISDNs) which feature the support of a wide range of voice and data applications in the same network. The ISDN concept emphasizes versatility which may be seen in the wide variety of applications that can be supported. This evolution towards an ISDN system features digital end-to-end connectivity by extending digital technology to the user ends.

Standards for ISDN are based on a layered protocol structure which first appeared as a series of ISDN Recommendations published by The International Telegraph and Telephone Consultative Committee (CCITT) under the title Integrated Services Digital Network (ISDN) Volume III, Fascicle III.5, 1984. These published recommendations initiated considerable development of ISDN systems generally, together with various service trials on an international scale. It is apparent that the utility and consequent success of ISDN depends greatly on the ability of both systems and products developed according to these recommendations to interwork with each other. The integration of devices and networks in conformance with ISDN standards laid down in the recommendations may only be achieved, however, through well defined testing procedures.

In order to ensure compliance with ISDN specifications and proper operation of network interfaces, all products are required to undergo rigorous testing prior to placement into the field. Since ISDN products are complex devices, extremely specialized test procedures and equipment are required to ensure accuracy in all test procedures.

In the present early phase of ISDN deployment, there is usually no network to transport ISDN traffic between the site of a test system and the development site of a system under test which are often geographically displaced. Consequently ISDN testing is generally conducted either in the test lab or "in-factory", with both the test system and the system under test located at the same site.

A common difficulty associated with "in-lab" testing relates to the problem of operating the system under test in an environment that is dissimilar to that of its development. Although development personnel need to come to the test lab to operate the equipment, they may not have all the development tools needed to support the new equipment when unexpected problems are uncovered during testing. Furthermore, the newly developed equipment may be cumbersome and difficult to move to a testing centre. A typical example would be a large PBX. "In-factory" testing requires that the test lab send a portable tester, together with expert personnel well versed in protocol, to the development site to conduct tests. Therefore, instead of transporting equipment to a test lab, a scaled-down version of the test lab is transported to the equipment.

In either "in-lab" or "in-factory" testing, there is the problem of mobilizing and coordinating expert personnel who will likely have to operate in an unfamiliar environment, without the support to which they are accustomed. This impacts negatively on the productivity of such personnel.

To effectively address the aforedescribed problems, remote testing is needed. Prior to this invention, however, the only known method for remote testing of ISDN protocols was to conduct such testing over telephone lines.

Remote testing of ISDN protocols over telephone lines provides only a partial solution at best since three problem areas are readily identified. The first is the necessity to modify the standard physical interface of the ISDN basic rate access equipment, both at the system under test and the test system interfaces, to allow connection to the transmission equipment interface of the telephone network which operates at a much lower rate. The second problem area concerns the poor transmission quality over long haul telephone lines. The transmission errors introduced may seriously affect the testing by falsifying the test results. The third problem area is the difficulty in setting up the circuits and transmission equipment needed for ISDN protocol testing.

In addition to the above problems, the communication costs of remote testing over telephone lines are very high compared to costs incurred when using the present invention.

SUMMARY OF THE INVENTION

Having regard to the aforedescribed problems recognized in ISDN testing, one provision of the present invention is flexibility via apparatus that will interface with a system under test at the standard ISDN interface rates.

Another provision of the invention is apparatus that will function over ubiquitous transport networks.

Still another provision of the invention is the minimization of acknowledgement delay to meet predetermined timing requirements imposed by ISDN protocols.

A further provision of the invention is built-in error detection and recovery to minimize problems caused by long haul transmission facility errors.

Yet another provision of the invention is the ability to propagate frame check sequence (FCS) errors, residual bit errors, abort sequences and physical layer failures which are intentionally generated by conformance test suites.

A still further provision of the invention is the ability to continuously monitor the operation of the physical test interface at a remote test site.

The problems associated with the prior art may be substantially overcome and the foregoing provisions achieved by recourse to the invention which relates to a communications system having a local terminal defined by a multilayered assembly of interrelated protocols, a corresponding remote terminal, and means for generating at the local terminal a test suite comprising protocol test messages of normal and erroneous behavior for the layers under test. One aspect of the invention is an improved method for protocol testing between predetermined corresponding pairs of layers in the terminals.

The method comprises the steps of, (a) splitting a network interface disposed at each terminal, (b) inserting at each split interface a configurable interface for matching predetermined apparatus connectable to each terminal as an element thereof, (c) communicating the configurable interfaces with a ubiquitous transport network for establishing at least one protocol testing path between the corresponding pairs of layers through at least one virtual circuit of the network adapted to pass transparently protocol test messages of normal behavior and to reject protocol test messages of erroneous behavior, and (d) identifiably encoding protocol test messages corresponding to erroneous behavior of the layers under test and further encoding such test messages as protocol test messages of normal behavior acceptable for transparent transmission over the at least one virtual circuit. A second aspect of the invention is apparatus for protocol testing between predetermined corresponding pairs of layers in the terminals. The apparatus comprises, (a) means for splitting a network interface disposed at each terminal, (b) means for inserting at each split interface a configurable interface for matching predetermined apparatus connectable to each terminal as an element thereof, (c) means for communicating the configurable interfaces with a ubiquitous transport network for establishing at least one protocol testing path between the corresponding pairs of layers through at least one virtual circuit of the network adapted to pass transparently protocol test messages of normal behavior and to reject protocol test messages of erroneous behavior, and (d) means disposed at the local terminal for identifiably encoding protocol test messages corresponding to erroneous behavior of the layers under test and further encoding such test messages as protocol test messages of normal behavior acceptable for transparent transmission over the at least one virtual circuit.

BRIEF DESCRIPTION OF THE DRAWINGS

The invention will now be more particularly described with reference to embodiments thereof shown, by way of example, in the accompanying drawings in which.

HIERARCHY OF PROTOCOL LAYERS

The aforementioned standards for ISDN that are based on a layered protocol structure were derived from an open systems interconnection (OSI) concept that expresses a relationship between a communications network, and services supported thereby, in the form of a multilayered assembly of interrelated protocols. Each layer includes at least one function that is contained between an upper and a lower logical boundary. The services of any layer are combined with the services provided by the lower layers to create new services that are made available to the higher layers.

The present invention is directed to layers 1, 2 and 3 which, along with layer 4, are concerned with the transmission, routing and switching of signals. The higher layers from 5 to 7 are concerned with the processing and use of data and are not further discussed except in the following definitions of these layers which are disclosed merely for completeness in describing the layered concept of ISDN.

Layer 1 is a physical layer that provides transmission of signals and the activation and deactivation of physical connections.

Layer 2 is a data link layer that includes signal synchronization, error correction, sequencing and flow control. This layer also provides a data transmission link across one or several physical connections.

Layer 3 is a network layer that provides routing and switching functions.

Layer 4 is a transport layer utilizing layers 1 to 3 to provide an end-to-end service having required characteristics for the higher layer functions.

Layer 5 is a session layer that provides the means to establish a session connection and to support an orderly exchange of data and related control functions for a particular communication service.

Layer 6 is a presentation layer that provides means for data formatting and code conversion.

Layer 7 is an application layer, the protocols of which provide the actual service sought by an end user.

DETAILED DESCRIPTION OF THE PREFERRED EMBODIMENTS

Basic End-to-End Architecture

Figure 1:
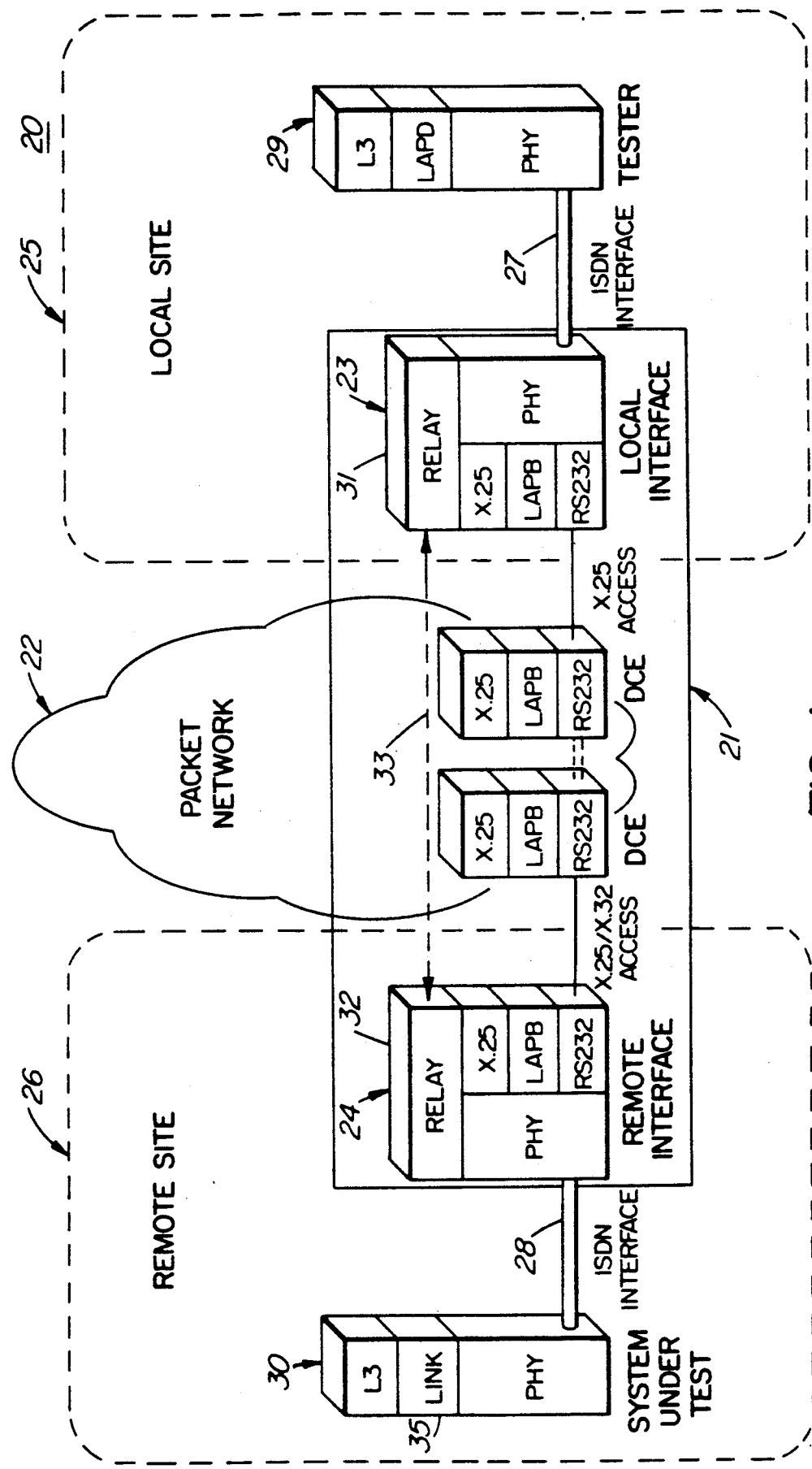
FIG. 1 is a block diagram of the present invention in a telecommunications system having a local and a corresponding remote terminal.

FIG. 1 illustrates a telecommunications system 20 that includes a basic end-to-end remote ISDN test access system 21. The system 21 will be seen to comprise a ubiquitous transport network shown as a packet switching network 22 and two remote testing packet switch adaptor interfaces 23 and 24, one at a terminal of a local site 25 and the other at a terminal of a remote site 26, respectively. It will be observed that the interfaces 23 and 24 are mirror images of one another and that a plurality of X.25 virtual circuits are established therebetween through the network 22. The interfaces 23 and 24 communicate over the virtual circuits of the network 22 to provide a relay function between a pair of ISDN interfaces 27 and 28. It will be further observed that the interface 27 communicates layers 1 of the interface 23 and a tester 29. Correspondingly, the interface 28 communicates layers 1 of the interface 24 and a system under test (SUT) 30.

Basically, the system 21 is designed to access both the tester 29 and the SUT 30 and to communicate both over the network 22 in order to support testing at the remote site 26. Such testing includes ISDN protocol conformance testing as well as interoperability testing of an ISDN product by remotely connecting same to an ISDN switching system, not shown. Since the tester 29 would normally include a broad base of test suites, it would be capable of permitting execution of individual or simultaneous multiple test sessions. Thus, a number of systems could be tested either independently or at the same time.

During testing, the SUT 30 is connected to the tester 29 via the interfaces 27 and 28 and the system 21. It will be understood that the key function of the local interface 23 and the remote interface 24 of the system 21 is to split its corresponding ISDN interface 27 and 28, respectively, and insert the network 22 therebetween. This is achieved by means of two relay components, a relay 31 at the local site 25, and a relay 32 at the remote site 26. It will be further understood that the access between the interface 27 and the network 22 is dedicated whereas the access from the interface 28 to the network can be either dedicated or switched. Furthermore, whereas reference has been made to a packet switching network 22 between the interfaces 23 and 24, the network 22 can also be replaced by either a dedicated or a switched line. In such a configuration, the interfaces 23 and 24 would interwork with each other in a data terminal equipment (DTE-to-DTE) mode.

The testing method to which the architecture of FIG. 1 applies is for layer 2 and layer 3 testing. It is noted that layer 2 is also referred to as LAPD or the data link layer.

Under normal conditions of use, the system 21 in FIG. 1 is replaced with the physical layer, layer 1, which is also referred to as a Service Provider to the adjacent layer 2. However, in conducting the testing of layer 2 in accordance with the present invention, layer 1 is replaced by the interface 23 at the local site 25 and the interface 24 at the remote site 26, both of which communicate through virtual circuits in the network 22. The protocol messages generated by the tester 29, like normal frames or frames with CRC error, abort sequence, residual bits, and the like, are received by the relay 31. These messages are then encoded into relay messages, and transmitted over the network 22. At the remote site 26, the corresponding relay 32 decodes the relay messages and regenerates the original protocol codes which are then received by the SUT 30 via the interface 28. The function of the interface 23 is to reproduce at the interface 24 the same signals as generated by the tester 29. A corresponding procedure is carried out in the reverse direction, where the signals received at the interface 24 are reproduced at the interface 23.

In addition to providing the layer 1 service to the tester 29 and to the SUT 30, the system 21 also establishes a test coordination channel 33 between the tester 29 and the SUT 30 so that an operator at the remote site could coordinate the test procedures. It will be understood that the channel 33 constitutes one virtual circuit of the network 22 and that an additional test coordination channel may be transmitted over a second virtual circuit of the network 22 if required.

When the SUT 30 comprises user or network equipment that is to be tested for conformance, the interface 24 emulates the functions of a single ISDN loop by way of a virtual circuit in the network 22 as may be seen in FIG. 1 Traffic on channels of the ISDN interfaces 27 and 28 are relayed onto separate X.25 virtual circuits through the network 22. This configuration is also used to connect ISDN user devices, not shown, at the remote site 26 to a switch, not shown, in place of the tester 29 to perform interoperability tests.

For conformance testing of network equipment, the tester 29 may be required to drive multiple ISDN interfaces corresponding to the interface 24 at the remote site 26. Although not shown, it will be understood that the interface 24 in this instance multiplexes the traffic of all of the ISDN interfaces over a corresponding single X.25 access link. The various corresponding channels on the different ISDN interfaces are relayed onto separate X.25 virtual circuits through the network 22.

Similarly, the interface 24 supports user devices at multiple remote sites to home on multiple ISDN loops of a local switch, not shown, that would be substituted for the tester 29. The channels of a plurality of ISDN interfaces, corresponding to the single interface 27 shown, would then be carried over separate X.25 virtual circuits, not shown, which would be multiplexed over the X.25 access link at the interface 23. In this way, the system 21 can emulate multiple ISDN loops connecting to an ISDN switch, not shown, for general interoperability testing.

In testing the protocols of layer 3 (Q.931) the same configuration of the interfaces 23 and 24 (FIG. 1) could be used. As in the case of layer 2 testing, the interfaces 23 and 24 would then provide the layer 1 Service via the network 22.

In this arrangement, all layer 2 frames (LAPD frames), including supervisory frames, together with layer 3 messages, would be carried over the network 22. However, this is unnecessary and consequently inefficient.

It will be understood that the configuration of the basic system 21 in FIG. 1 may also be used for layer 3 testing. Instead of relaying layer 2 frames, the interfaces 23 and 24 will now relay layer 3 messages. A local layer 2 service, hereinbelow described in greater detail, is disposed at both interfaces 23 and 24. Layer 3 messages received at the interface 23 through the local layer 2 service, will be reproduced at the interface 24 at the remote site 26 after being relayed through the network 22. In a reverse direction, corresponding messages received at the interface 24 at the remote site 26 will be relayed through the network 22 and reproduced at the interface 23 at the local site 25. As previously disclosed, the channel 33 is established between the tester 29 and the SUT 30. A second relay message channel between the relays 31 and 32 may also be established through a second virtual circuit of the network 22 if required.

A bandwidth mismatch between the network 22 X.25 access and the layer 1 physical channel being tested over the interfaces 27 and 28 necessitates a store and forward technique that is used in the interfaces 23 and 24. This takes advantage of the burstiness of the ISDN traffic that is interleaved with relatively long idle periods during which no information need be relayed over the virtual circuits of the network 22. Normally, only frames or messages pertaining to the protocol tests will be carried over the virtual circuits.

A problem encountered with the store and forward technique is that this method cannot provide faithful physical layer 1 relay functions. Rather, the technique breaks the end-to-end integrity of the underlying layer 1 physical channel of the ISDN interfaces 27 and 28. Additionally, there may also be an introduction of very long individual hop transmission delays over the network 22. In order to preserve protocol transparency for accurate testing and to cope with performance delays encountered in testing, two types of relay operation are supported by the system 21 Architectural and functional aspects of these relays will be described in greater detail hereinbelow.

RELAY OPERATIONS

Figure 2:
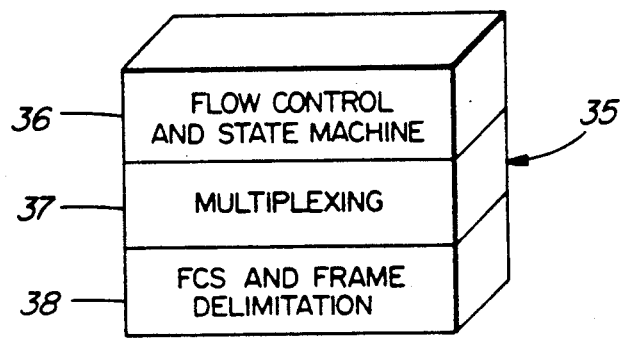
FIG. 2 is a block diagram showing three sublayers of a LAPD layer in FIG. 1.

Layer 2 of the ISO layered system hereinabove described can be partitioned into three sublayers shown as the link layer LAPD 35 in FIG. 2. The top sublayer 36 is the most procedurally oriented of the three. This layer interfaces with layer 3 and is concerned with flow control, state transition, and protocol error recovery procedures.

The middle sublayer 37 provides multiplexing and processes the address of each frame.

The bottom sublayer 38 interfaces with the physical layer 1 and conducts the following functions for individual frames:

(a) frame delimitation by flags;
(b) preservation of transparency of information by bit stuffing; and
(c) frame integrity protection, e.g., by a frame check sequence.

The link layer LAPB, not shown, can be partitioned similar to LAPD 35. The former link layer differs from the latter, however, by the fact that the middle sublayer of LAPB is a null sublayer as LAPB does not support the multiplexing function. Otherwise, these two link layers are the same.

TYPE 1 RELAY

Figure 3:
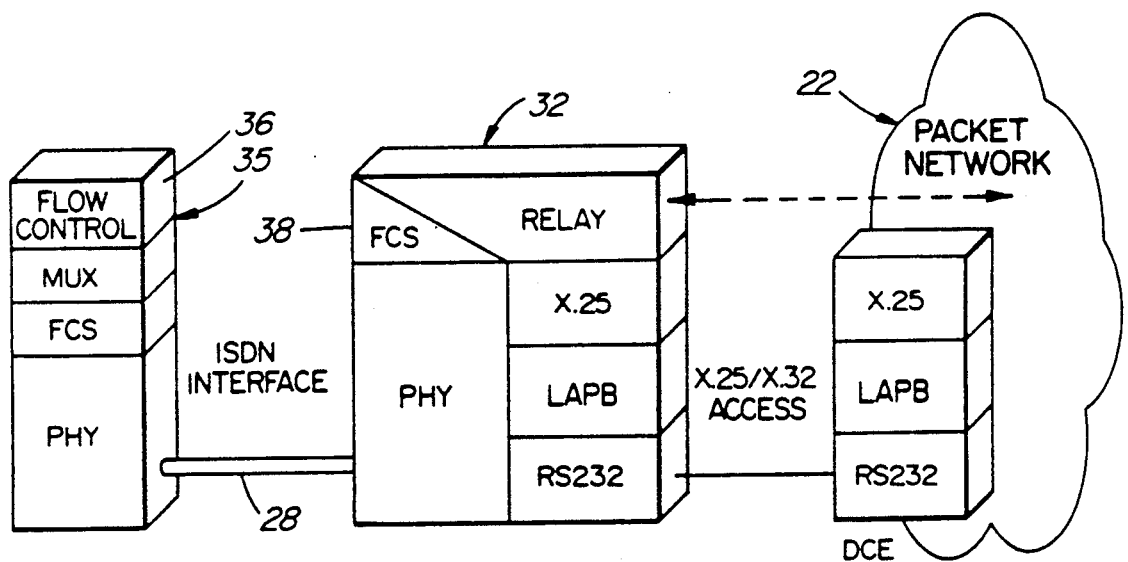
FIG. 3 is a block diagram of a Type 1 relay used in the present invention for testing layer 2 in FIG. 1.

It will be understood that conformance and interoperability tests ar normally performed over an ISDN interface at which the physical layer 1 is operational. As previously noted, however, the network 22 uses store and forward as a means for information transfer and is therefore unable to relay an entire bit stream of a physical channel of the ISDN interfaces 27 or 28 shown in FIG. 1. The Type 1 relay (FIG. 3) operation functions to minimize the impact on the protocol operation of a D-channel being tested and is carried out at the sublayer 38 of LAPD 35. It should be noted, however, that the Type 1 relay operation should be used for conformance testing of layer 3 and interoperability tests only under very ideal conditions.

Relay elements 31 and 32 (FIGS. 1 and 3) function as intermediaries between the interfaces 23 and 24 and use the X.25 service provided by the packet layer to relay LAPD frames. In this way, good LAPD frames pass the system 21 transparently with their contents unaltered.

Since the relay function is provided at the bottom sublayer 38, LAPD frames with FCS errors, residual bit errors, or abort sequences cannot pass through transparently. However, such LAPD frames are passed, together with indications of the errors, over the virtual circuits of the network 22. The errors are therefore subsequently regenerated in the LAPD frames by the target interface 23, 24, depending on the direction of traffic flow.

The regenerated errors do not necessarily have precisely the same bit pattern as the original errors. Should they exist, however, such discrepancies are insignificant from the perspective of LAPD protocol and will have inconsequential effects on protocol conformance testing.

In addition to error regeneration, changes of operational status of the physical layer 1 of one of the ISDN interface 27 or 28 are reproduced at the target ISDN interfaces 28 or 27 depending on traffic direction. This serves two purposes. There is enabled the regeneration of physical layer 1 failures towards the SUT 30, which are purposely introduced for the tests. It also isolates unpredictable test results caused by malfunctions of the physical interface connected to the SUT 30 (FIG. 1).

A similarity of performance may also be seen in the Type 1 relay (FIG. 3) for LAPB over B-channels. The only difference is that residual bits are not treated as protocol errors and are passed to the other end transparently.

TYPE 2 RELAY

Layer 3 conformance and interoperability tests are usually performed after the underlying link layer LAPD 35 testing is completed. At this stage, the underlying link procedure may reside in ROM (not shown). As a consequence, ROM timer values cannot be readily changed. It becomes necessary, therefore, for the system 21 to cope with the real time performance of the underlying link layer.

The Type 2 relay (FIG. 4) operation was developed to prevent problems caused by unwanted timeouts at the LAPD 35 link layer during Layer 3 and interoperability tests. This relay function is performed at the top link sublayer 36 when the LAPD 35 link layer is fully terminated at its associated interface 23 or 24. The link layer of the interfaces 23 and 24 maintains its timers, send windows and receive windows and generates acknowledgements to I-frames received from its corresponding ISDN interface 27 and 28, respectively.

Under the Type 2 relay operation, only ISDN layer 3 messages, link layer service primitives, and status changes of the ISDN physical interfaces 27, 28 (FIG. 1) are exchanged over the virtual circuits of the network 22 by the interfaces 23 and 24. Information on link layer addressing is passed with the message and primitive exchanges for the target interface 23, 24, depending upon traffic direction, to regenerate the corresponding frames onto its ISDN interface 27 or 28, respectively. As in the Type 1 relay, the information exchange on the status changes of the ISDN physical interface 27, 28 is used to control the corresponding interface at the other end.

The Type 2 relay minimizes the delay in frame acknowledgements and Layer 3 messages are still generated from either site 25 or 26. However, layer 3 timers are greater than 4 seconds and accordingly are much less susceptible to any delay introduced over an X.25 virtual circuit in the network 22.

The Type 2 relay is not transparent to the link layer LAPD 35 operation of the ISDN interface 28 being tested. The windowing mechanism as well as the flow control of the link layer LAPD 35 has only local significance on the interface 28. However, such transparency is not required for layer 3 conformance or interoperability tests once the link layer LAPD 35 of the SUT 30 is proven to be completely functional. It should be understood that the Type 2 relay is also applicable to LAPB operation.

ARCHITECTURE FOR CONFORMANCE TESTING

Figure 5:
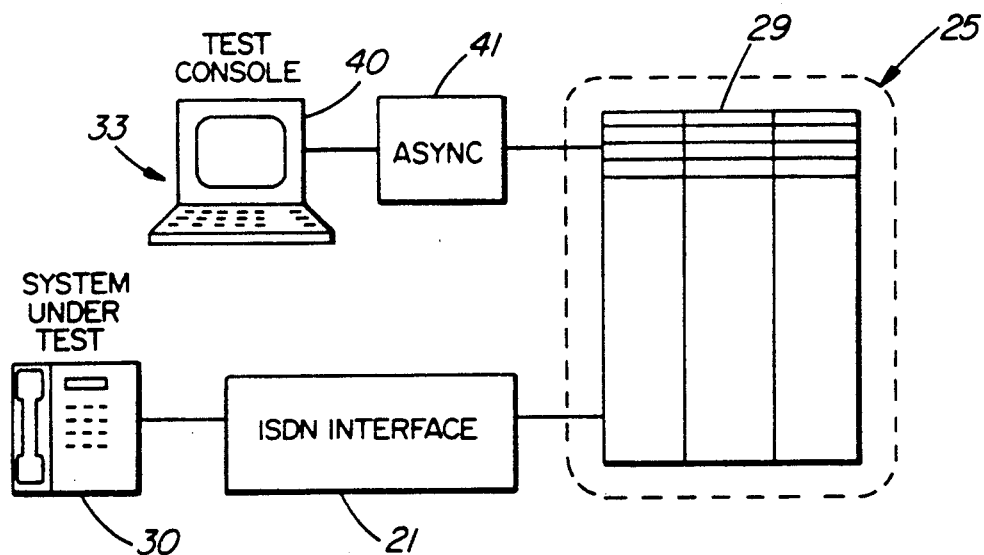
FIG. 5 is a block diagram of a known system configuration for conformance testing.

The tester 29 drives two interfaces during testing. As shown in FIG. 5, communication between the tester 29 and the SUT 30 occurs in a known manner via the system 21. In addition, communication with an operator at a keyboard of a test console 40 occurs via an asynchronous interface 41 to permit test coordination with the developers of the SUT 30.

It will be recalled from the description of FIG. 1 that the system 21 employs an X.25 virtual circuit to carry the traffic of each channel being tested on an ISDN interface. In the case of a basic rate access, referred to as 2B+D, there are two B-channels (bearer channels) used for either data or voice and one D-channel which is used as a signalling channel. Another form of ISDN service is primary rate access, referred to as 23B+D, that provides 23 B-channels (bearer channels) together with one signalling D-channel. A European primary rate access is 30B+D.

Figure 6:
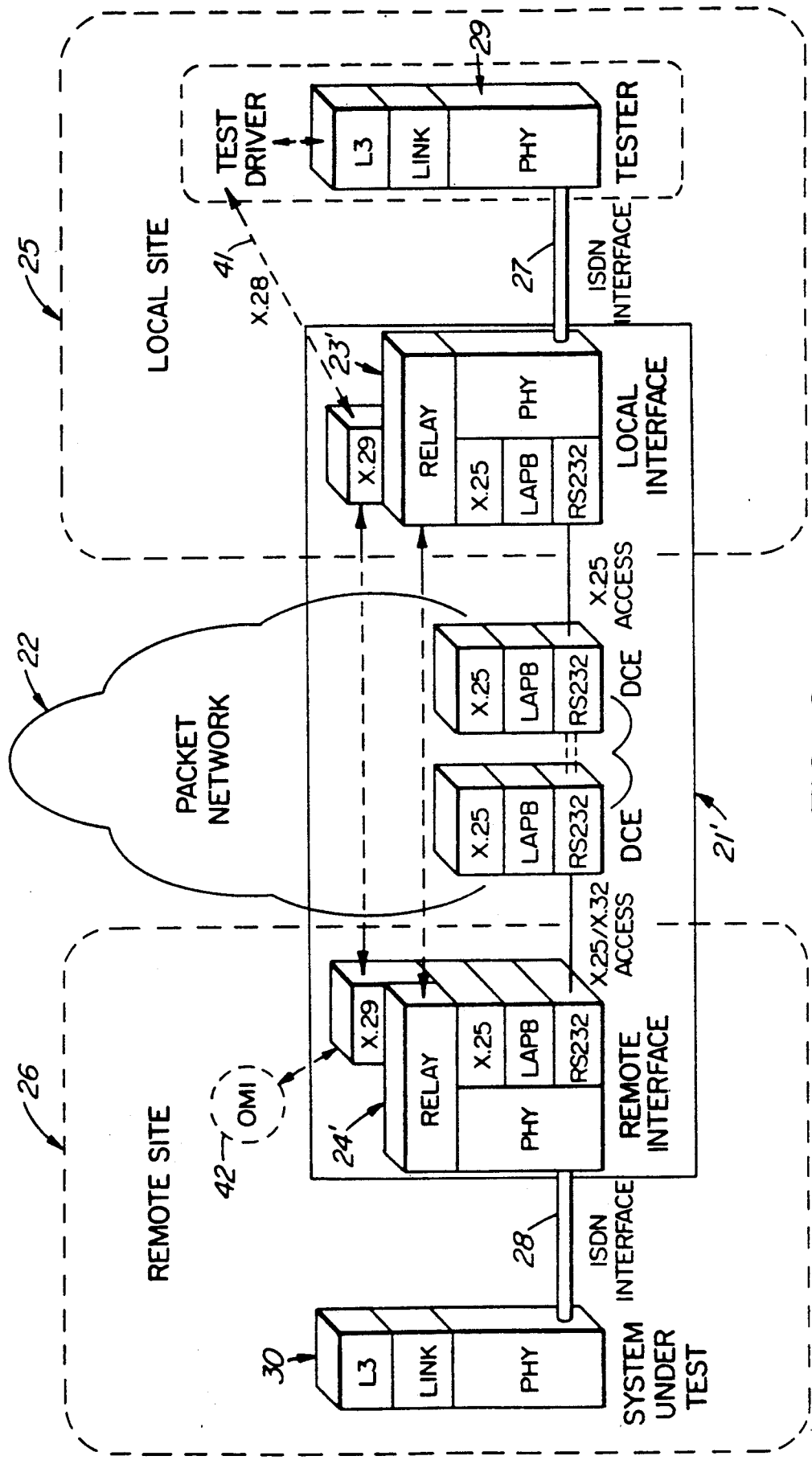
FIG. 6 is a detailed block diagram of architecture embodying the invention for conformance testing.

In addition to the virtual circuits used for the ISDN channels, a basic end-to-end remote ISDN test access system 21' for conformance testing, shown in FIG. 6, employs a separate X.25 virtual circuit to extend the interface 41 to the remote site 26. In the system illustrated in FIG. 6, a remote testing packet switch adaptor interface 23' functions as a DTE PAD for the interface 41. At the remote site 26, the messages carried on the X.25 virtual circuits to the test console 40 of the SUT 30 are also mapped into an operator-machine interface 42 for the developers of the SUT 30.

Figure 4:
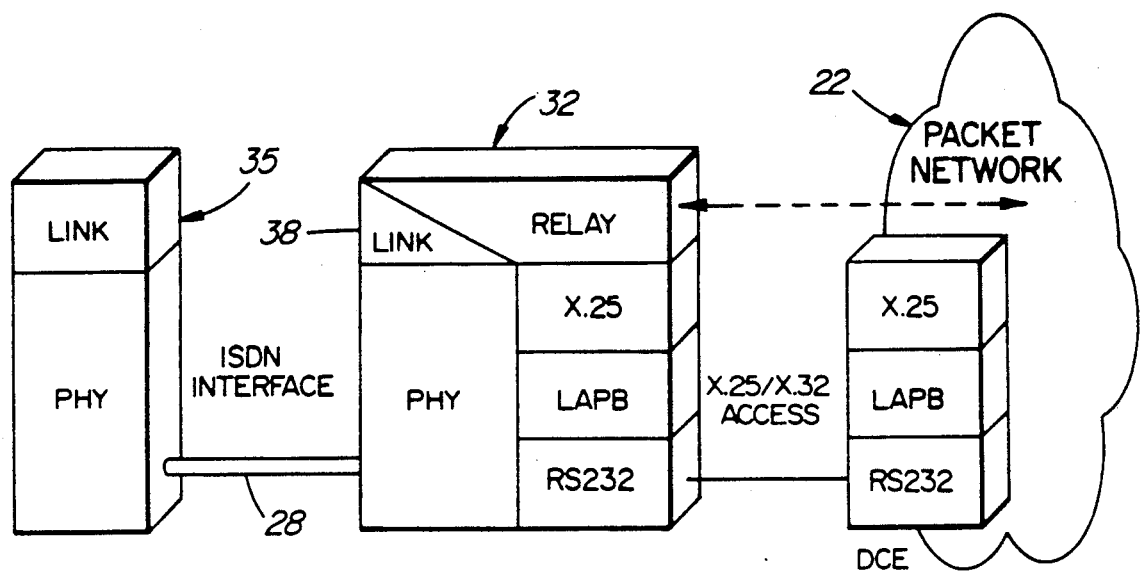
FIG. 4 is a block diagram of a Type 2 relay used in the present invention for testing layer 3 in FIG. 1.

The end-to-end architecture of the system 21' in FIG. 6 has been specifically adapted for conformance testing and includes the aforedescribed Type 1 relay for conformance testing of link layers. Although the Type 1 relay could also be used for Layer 3 conformance testing under ideal conditions, the Type 2 relay of FIG. 4 is preferable, especially when the transmission rate of the packet-switched access is low or when the remote site 26 is at a great distance.

Figure 7:
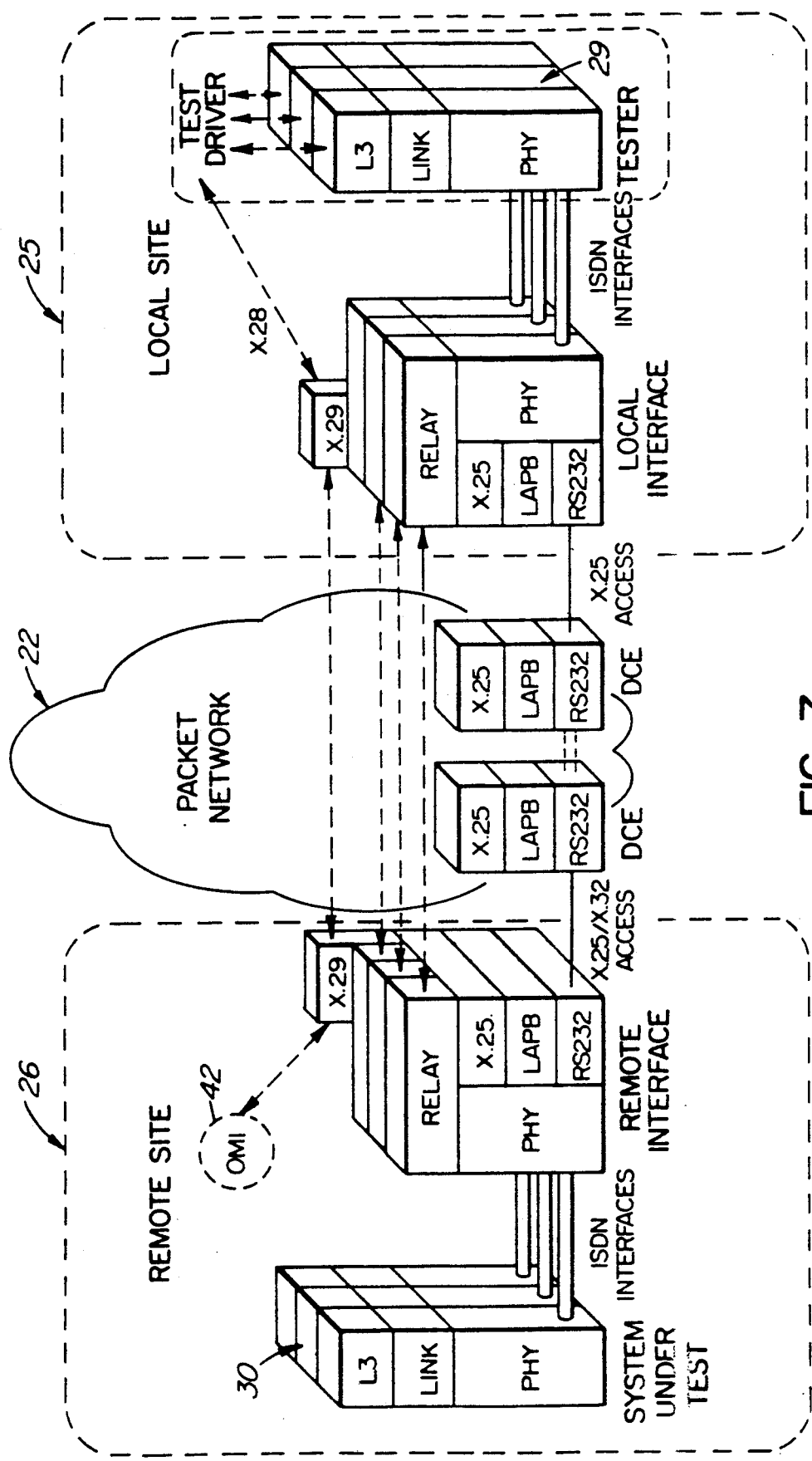
FIG. 7 is a more detailed block diagram showing architecture of the present invention for conformance testing with multiple ISDN interfaces.

In conformance testing of network equipment, it is required to drive the SUT 30 from more than one ISDN loop via the network 22. In FIG. 6, the system 21' is used to relay and multiplex all the channels of the ISDN loops over the network 22 as illustrated in more detail in FIG. 7. As previously described, an X.25 virtual circuit is used for each tested channel. The Type 2 relay is preferred under these circumstances as only conformance testing for layer 3 and above can involve more than one ISDN loop. As in the case of conformance testing for a single ISDN interface, a separate virtual circuit is employed for test coordination (FIG. 7).

ARCHITECTURE FOR INTEROPERABILITY TESTING

Since the ultimate goal of testing is to have user devices interworking with network equipment, the remote ISDN test access systems of the present invention permit user devices to verify with network equipment their interoperability from remote sites.

Figure 8:
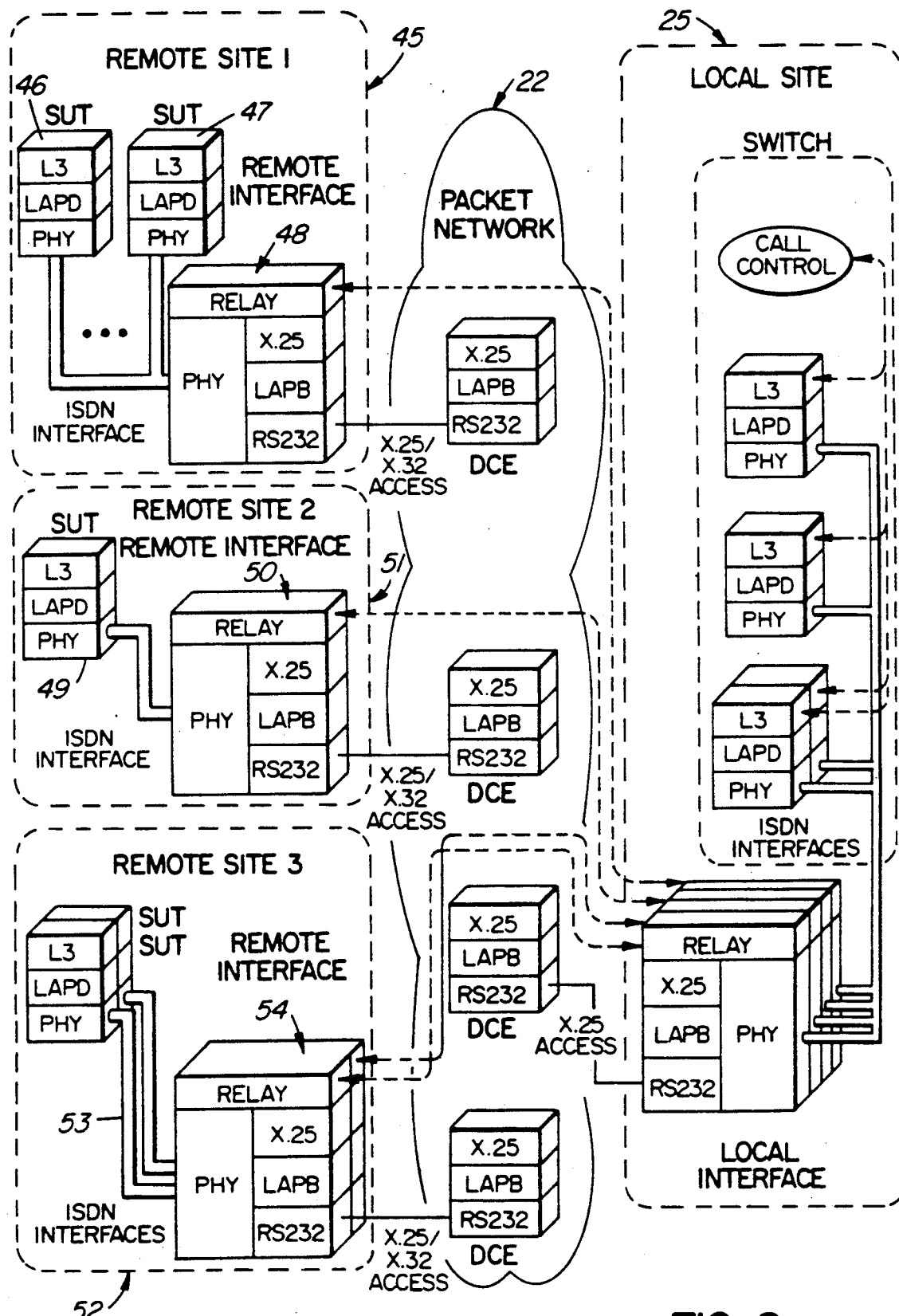
FIG. 8 is a block diagram of an embodiment of the present invention in a system for interoperability testing.

A single local remote ISDN test access interface can be used to support multiple remote test access interfaces at different sites. At the remote sites, different scenarios are permitted, examples of which are illustrated in FIG. 8. Thus, at a remote site 45 multiple user devices, shown as systems under test 46 and 47, are connected to a 2B+D basic rate interface of a remote ISDN test access interface 48. For a primary rate interface, only a single user device, shown as a system under test 49, may be connected to a remote ISDN test access interface 50 as shown at a second remote site 51. At a third remote site 52, multiple ISDN interfaces 53 are shown connected to the network 22 through a remote ISDN test access interface 54. It will be understood that the interfaces 48, 50 and 54 at the aforenoted remote sites can be a combination of both Basic and Primary Rate interfaces.

REMOTE ISDN TEST ACCESS IMPLEMENTATION

Hardware

All of the heretofore described remote ISDN test access systems may be fabricated from readily obtainable products that are configured in a novel way by means of software. Thus, any one of the test access interfaces heretofore described is based on an IBM AT TM or XT TM computer or compatibles 60, together with two PC interface cards (FIG. 9):

(a) A Northern Telecom Limited PC Terminal Adapter (PCTA) card 61 interfacing the SUT 30 via the interface 28 (FIG. 1) to which reference has already been made. This card is configurable by software to present either a Network (NT) or a Terminal (TE) interface to the SUT 30. By default the card is configured to present a NT interface.

(b) An X.25 interface card 62 that is available from the Eicon Technology Corporation. This card can be configured by software to use either the RS-232-C port for connection to an external modem (clocking should then be provided by the modem with a bit rate of up to 19.6 Kbps) or a telephone jack RJ-11 for X.25 dialed access. In the latter case, an on-board V22bis modem is used with automatic dialing capability.

The two cards could be installed in any of the expansion slots of the PC 60. The card 61 takes the space of two slots. The cards are set for the following configuration:

The PCTA card 61 uses:
1. Interrupt Request Level: IRQ3
2. I/O address: 2F8 - 2FF
3. Interrupt vector: 0B
4. DMA channel: DRQ 1

The X.25 card 62 uses:
1. Interrupt Request Level: IRQ5
2. I/0 address: 398 - 39F
3. Memory address: 4 Kbyte memory segment starting at D000.

Figure 9:
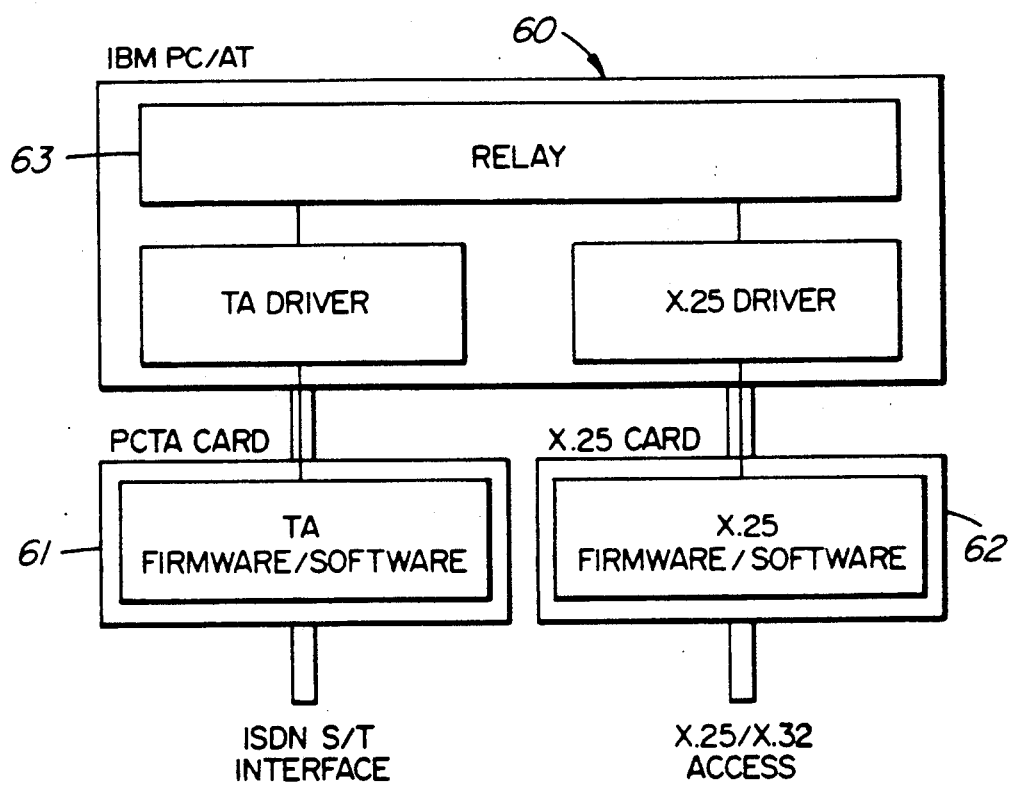
FIG. 9 is a block diagram of computer controlled apparatus for implementing the present invention.

It is important to note that the user must ensure that during the execution of the invention herein described, no other peripherals use the same system resources as listed in the aforenoted hardware installation. In particular, COM2 (serial port 2) and LPT2 (parallel port 2) should not be used by other equipment without reconfiguring the test access system of the present invention. FIG. 9 illustrates in block diagram form the implementation structure which is the same for any one of the systems 21 and 21' hereinabove described. Relating this structure to the system 21 of FIG. 1, it will be understood that the card 61 provides individual ones of the interfaces 27 and 28 and that the X.25 card provides the X.25/X.32 access, whereas the software in the PC 60 provides the relay function for the transfer of information between the local and remote sites 25, 26 of the system 21, and also the interface 42 shown in FIGS. 6 and 7.

FUNCTIONS OF THE PCTA CARD

The original Northern Telecom Limited PCTA card that was available commercially was designed to drive an ISDN interface in a basic rate access mode. The card 61 has the following characteristics:
1. Supports ISDN Layer 1 T-interface
2. Supports ISDN Layer 2 Q.921 multi-frame LAPD protocol
3. Provides an interface to Layer 3

The hardware of the card 61 is known and consists of a microprocessor based subsystem, not shown, which is firmware/software driven. A known bootstrap ROM, not shown, provides immediate control of the card 61 after powerup. Program RAM, not shown, which is downloaded from the PC 60 provides flexible software control of the card 61 D-channel and the B-channel functions and protocols. The card 61 software is normally stored in a hard disk, not shown, of the PC 60 and is downloaded into the card 61 after powerup.

The physical layer 1 of the card 61 is software configurable to either TE or NT mode, as previously discussed, and is used by the system 21 to match the equipment connected at the other end. A separate card, not shown, can be used for connection to the D-channel of primary rate access.

A current version of the card 61 that is used in an interface such as the interface 23, 24, (FIG. 1) employs a Zilog SCC chip as a high level data link controller which performs the function of the bottom sublayer of LAPD; this includes transmission and reception of frames delimited by flags, bit stuffing and deletion, generation of FCS bytes, detection of FCS errors, and generation and detection of abort sequences and of residual bits.

Software

Software for the original card 61 was modified to provide various required functions to meet requirements of the systems 21 and 21'.

Figure 10:
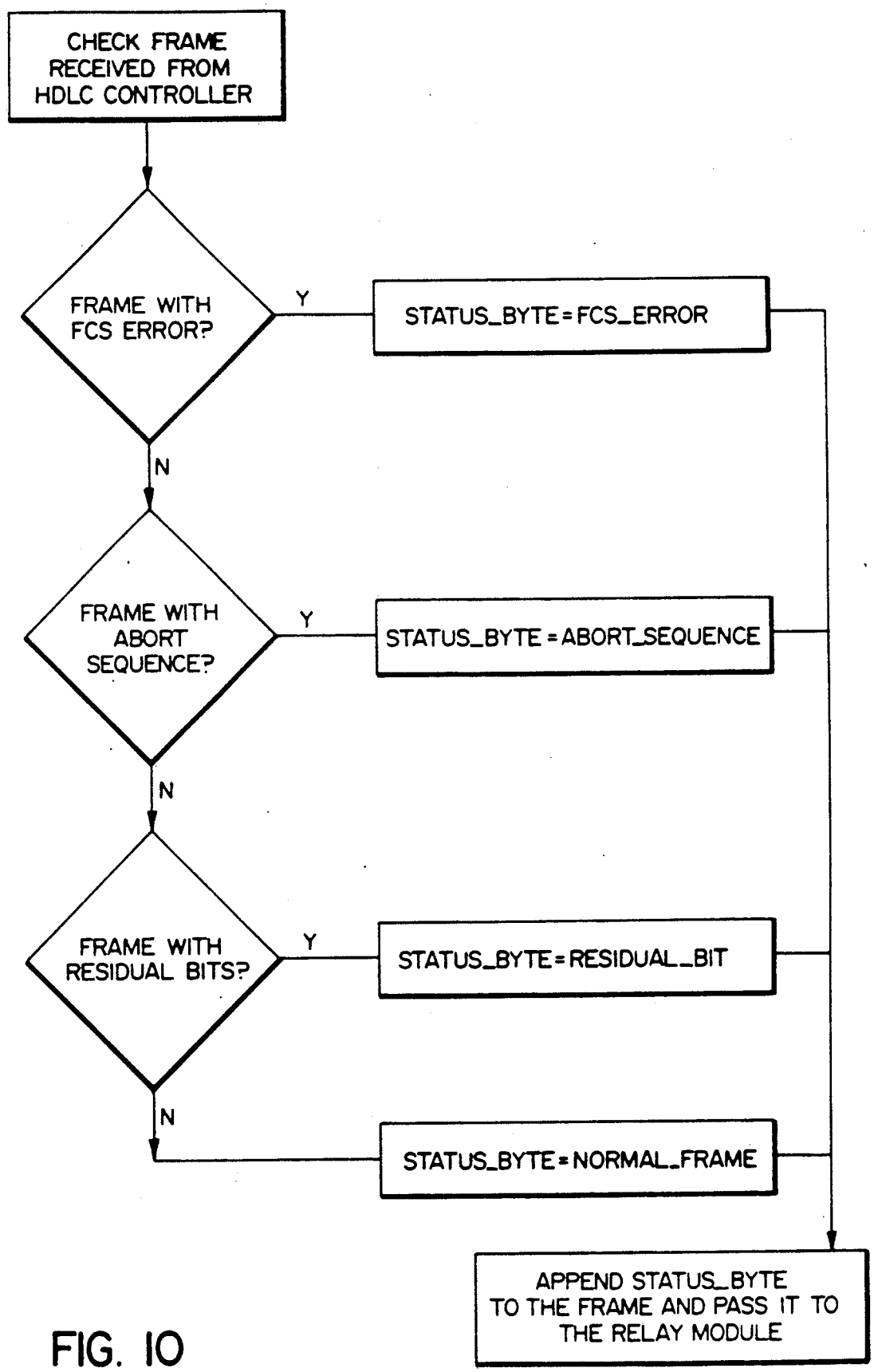
FIG. 10 is a flow chart depicting the encoding of frames received from an ISDN interface.
Figure 11:
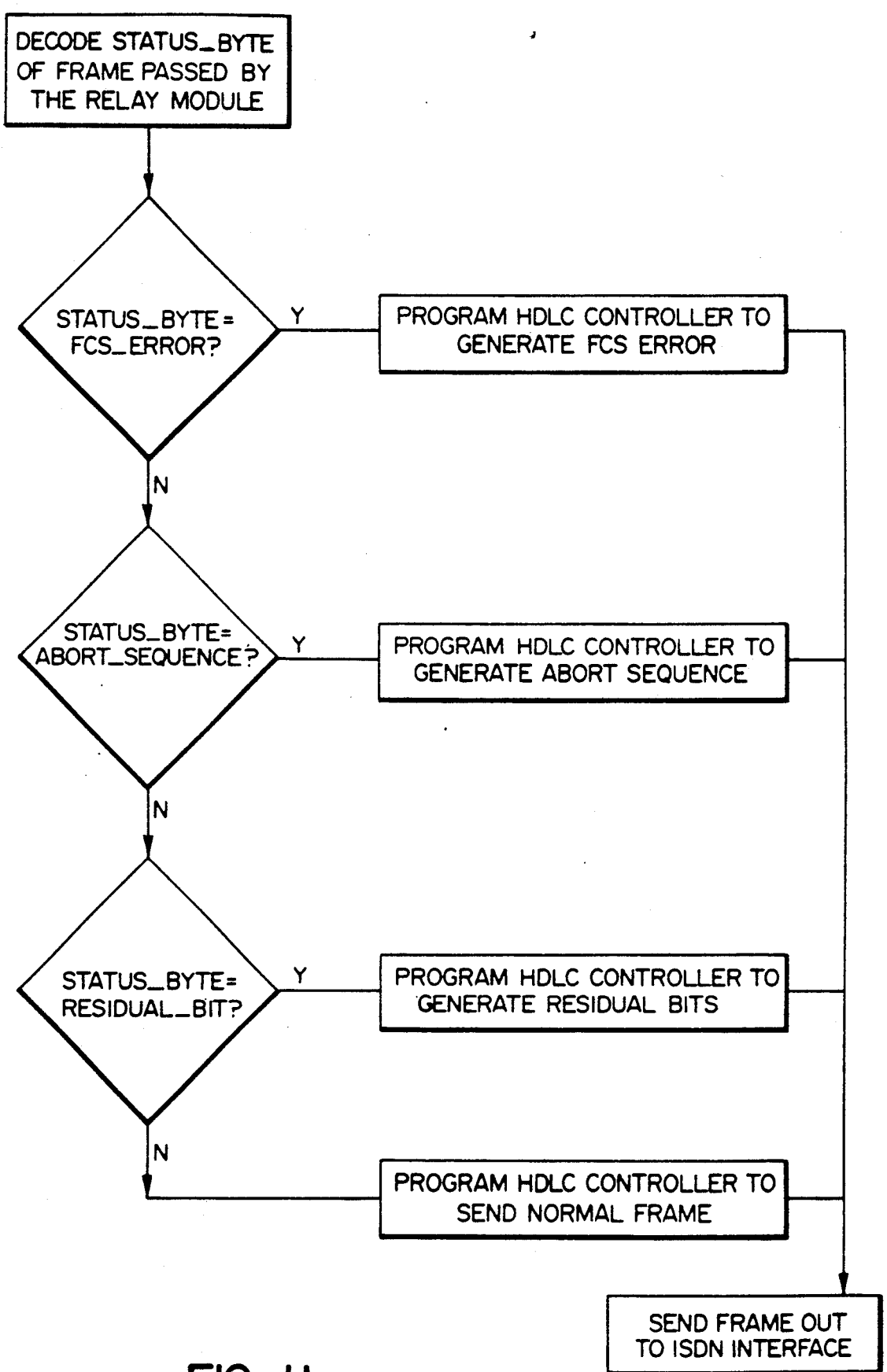
FIG. 11 is a flow chart depicting the reconstitution of frames directed to an ISDN interface.

For Type 1 relay operation, the software appends a status byte to each frame received by a high level data link control (HDLC) controller, not shown, of the card 61 to reflect the condition under which the frame is received. A flow chart of this aspect of the software is illustrated in FIG. 10 wherein it will be seen that the frame with its status byte is passed to a relay module 63 from which the frame is relayed to the target test access interface. For example, in FIG. 1 such relays occur between the interfaces 23 and 24. Thus, at the target interface, the status byte is decoded by the card 61 software which will program the HDLC controller to generate either a normal frame or a frame with FCS error, or abort sequence or residual bits depending on the value of the status byte. FIG. 11 shows this aspect of the modified software in the form of a flowchart that illustrates reconstitution of frames to an ISDN interface.

Figure 12A:
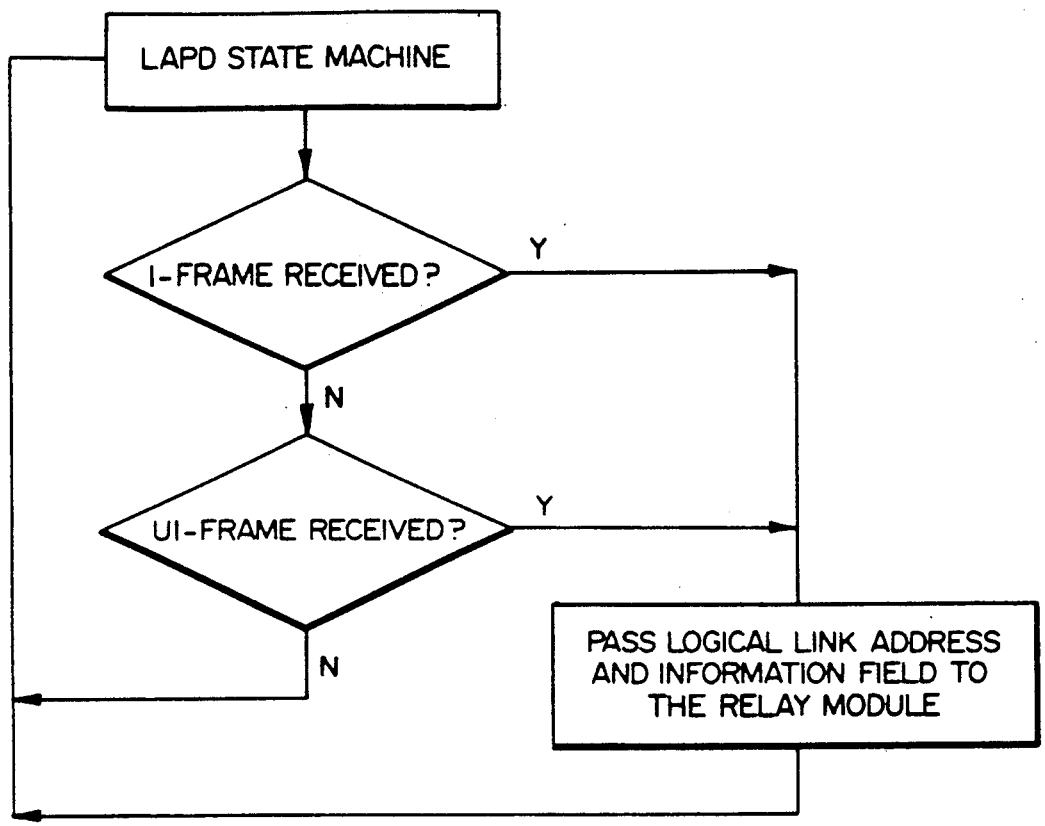
FIGS. 12a and 12b are flow charts of a Type 2 relay information transfer between a terminal adapter of a computer in FIG. 9 and a relay module of the present invention.
Figure 12B:
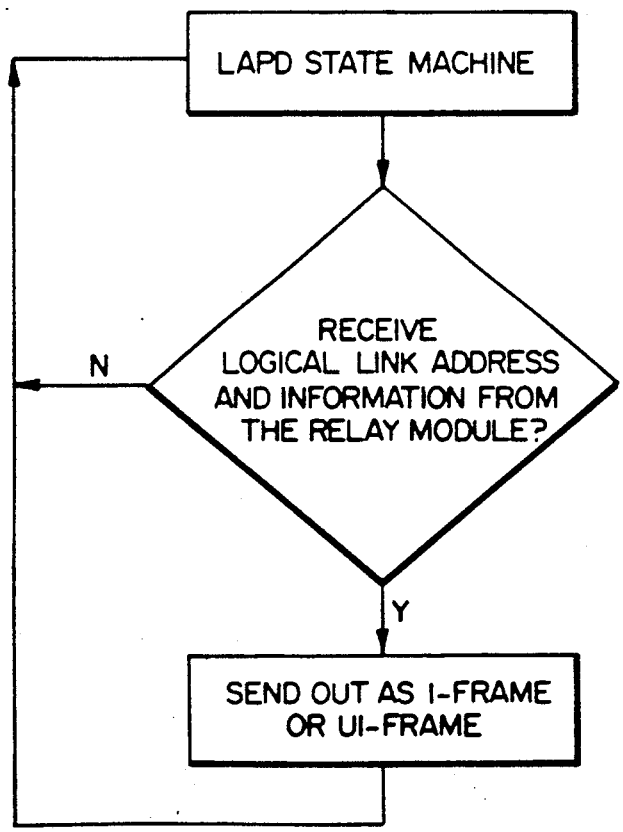

In the case of the Type 2 relay, the card 61 software performs all the link layer functions. Only I-frames and UI-frames, which normally contain ISDN Layer 3 messages, are passed to the relay module 63 with a two byte header to identify the logical link over which the frames were received. At the target test access interface, those I-frames and UIframes, together with the information on the logical link, are passed to the card 61 software which will send them out on the proper logical link. For a link layer with dynamic TEI, the TEI values at each one of the interfaces 23, 24, (FIG. 1) may be different. The system 21 at the local site 25 maintains a mapping table and performs the TEI value mapping as illustrated in flowchart form in FIG. 12 that shows information transfer between the card 61 and the relay module 63.

FUNCTIONS OF THE X.25 CARD

The X.25 card 62 currently used is a commercially available product as previously disclosed that supports the following:
1. Switched and dedicated links
2. Auto-dial and Auto-answer for switched links
3. DTE-to-DCE and DTE-to-DTE modes
4. Packet service interface for its applications The X.25 card is used to transfer messages between the interfaces 23 and 24 (FIG. 1). The current system 21 implementation can operate on three network combinations between the interfaces 23 and 24:
1. Dedicated packet access at both interfaces 23 and 24;
2. Switched packet access at the remote interface 24 and dedicated packet access at the local interface 23; or a
3. Circuit switched line between the interfaces 23 and 24.

THE PC SOFTWARE

Software for the PC 60 based embodiments of the invention illustrated and described herein controls the card 61 interface and manages the two virtual circuits established between the remote and local interfaces 24 and 23, respectively. One of the virtual circuits is used to transfer information between the interfaces 24 and 23 as may be seen in FIG. 6. The second virtual circuit is used for communication between the SUT operator at the test console 40 and the tester 29.

The PC software also monitors and decodes ISDN Q.931 and Q.921 protocol data units into mnemonic form during a test session. The software will also provide a friendly user interface through the management of windows and the use of a mouse as required.

At initialization, the software for the card 61 and the card 62 (FIG. 8) stored on the hard disk, not shown, are downloaded from the PC 60. In FIG. 6 the interface 23' will then wait for incoming calls on its X.25 interface. When ready, the interface 24' at the remote site 26 will issue X.25 calls to establish two virtual circuits with the interface 23' at the local site 25. One of the virtual circuits is used for communication between the test system and the SUT operator at the test console 40 as previously noted. On this virtual circuit, pockets with Q-bits will be used to remotely execute system 21' commands such as switching between Type 1 and Type 2 relays, modifying display characteristics, and the like.

Frames that are received from the card 61 are packetized in a known manner and sent over a X.25 virtual circuit to the target interface by the relay module 63. At the target end, the frames are reconstituted and passed to the card 61 software for transmission on the ISDN interface 27 or 28, depending on the direction of traffic flow.

The status of the interface 28 and of the link layer when operating in Type 2 relay mode, are monitored by the card 61 software and conveyed to the PC 60 software. When an ISDN physical layer 1 is out of synchronization, the relay module 63 (FIG. 9) will communicate this status to the target system 21 interface by sending the information in a Q-bit packet. The interface at that site will then trigger the card 61 to bring its ISDN interface out of synchronization. After synchronization at the physical interface is recovered, messages are sent to the target system 21 interface for recovery of its synchronization in its physical layer.

Layer 2 frames and ISDN layer 3 messages are decoded into mnemonics and displayed on a PC monitor, not shown.

For conformance testing, the interface 23 at the local site 25 communicates asynchronously with the tester 29 for test coordination. At the SUT 30 end, the test console 40 features are integrated with the remote site 26 PC interface with known software to support pull-down menu selections and multiple screens. With the use of color to distinguish different types of information, the PC 60 offers a particularly user friendly interface on the interface 24' (FIG. 6).

The interface 23 at the local site 25 can connect to either a conformance tester or an ISDN switch. With the use of portable PCs, a test site for the ISDN product can readily be set up anywhere that a telephone line can access the packet switching network 22.

The embodiments of the invention hereinabove described rely, in most instances, on block diagrams to describe various circuits elements and their respective functions. These block diagrams represent circuits that would be known to those skilled in the art to whom this specification is addressed, although not in the novel combinations disclosed. Accordingly, the foregoing constitutes a sufficient description to such individuals for a comprehensive understanding of the best mode contemplated to give effect to the embodiments as disclosed and claimed herein. Although program listings have not been included to disclose the precise manner of digital computer programming to perform the operations desired, the detailed functional description presented herein, together with related flowcharts, would permit a skilled computer programmer to program the PC 60 to perform all required operations.

It will be recalled that a best mode description has been given in respect of Type 1 and Type 2 relays as well as in various system configurations that are best suited to specific test applications. In each instance, the description given may be taken as the best current mode for the test function described.

To those individuals skilled in the art to whom this specification is addressed, it will be apparent that the embodiments heretofore described may be varied to meet particular specialized requirements without departing from the true spirit and scope of the invention disclosed. The foregoing embodiments are therefore not to be taken as indicative of the limits of the invention but rather as exemplary structures of the invention which is described by the claims appended hereto.

The embodiments of the invention in which an exclusive property or privilege is claimed are defined as follows:

1. In a communications system having a local terminal defined by a multilayered assembly of interrelated protocols, a corresponding remote terminal, and means for generating at the local terminal a test suite comprising protocol test messages of normal and erroneous behavior for the layers under test, an improved method for protocol testing between predetermined corresponding pairs of layers in the terminals, comprising the steps of:
   (a) splitting a network interface disposed at each terminal;
   (b) inserting at each split interface a configurable interface for matching predetermined apparatus connectable to each terminal as an element thereof;
   (c) communicating the configurable interfaces with a ubiquitous transport network for establishing at least one protocol testing path between the corresponding pairs of layers through at least one virtual circuit of the network adapted to pass transversely protocol test messages of normal behavior and to reject protocol test messages of erroneous behavior; and
   (d) identifiably encoding protocol test messages corresponding to erroneous behavior of the layers under test and further encoding such test messages as protocol test messages of normal behavior acceptable for transparent transmission over the at least one virtual circuit.

2. A method as claimed in claim 1 comprising the further step of transparently relaying selected ones of the encoded protocol test messages between the configurable interfaces of the local and remote terminals.

3. A method as claimed in claim 2 comprising the further step of relaying the encoded protocol test messages from the remote terminal to the local terminal.

4. A method as claimed in claim 2 comprising the further steps of decoding the encoded protocol test messages received at the remote terminal and regenerating the original protocol test messages of erroneous behavior into substantially the same form as generated by the test suite generating means.

5. A method as claimed in claim 4 comprising the further step of configuring the configurable interfaces to represent either a network (NT) or terminal (TE) side of the network interface.

6. A method as claimed in claim 5 wherein the network interface at each terminal is an ISDN interface.

7. A method as claimed in claim 6 comprising the step of previously connecting the ISDN interface at the remote terminal with a system to be tested.

8. A method as claimed in claim 7 wherein the configurable interfaces are individually and selectively configured under software control by computer means disposed at respective ones of the terminals.

9. A method as claimed in claim 8 comprising the further step of configuring the configurable interface at the local terminal to operate as a data circuit terminating equipment.

10. A method as claimed in claim 9 comprising the further step of configurating the configurable interface at the remote terminal to operate as a data terminal equipment.

11. In a communication system having a local terminal defined by a multilayered assembly of interrelated protocols, a corresponding remote terminal, and means for generating at the local terminal a test suite comprising protocol test messages of normal and erroneous behavior for the layers under test, apparatus for protocol testing between predetermined corresponding pairs of layers in the terminals, comprising:
   (a) means for splitting a network interface disposed at each terminal;
   (b) means for inserting at each split interface a configurable interface for matching predetermined apparatus connectable to each terminal as an element thereof;
   (c) means for communicating the configurable interfaces with a ubiquitous transport network for establishing at least one protocol testing path between the corresponding pairs of layers through at least one virtual circuit of the network adapted to pass transparently protocol test messages of normal behavior and to reject protocol test messages of erroneous behavior; and (d) means disposed at the local terminal for identifiably encoding protocol test messages corresponding to erroneous behavior of the layers under test and further encoding such test messages as protocol test messages of normal behavior acceptable for transparent transmission over the at least one virtual circuit.

12. Apparatus as claimed in claim 11 further comprising means for relaying the encoded protocol test message from the remote terminal to the local terminal.

13. Apparatus as claimed in claim 12 further comprising means for decoding the encoded protocol test messages received at the remote terminal and regenerating the original protocol test messages of erroneous behavior into substantially the same form as generated by the test suite generating means.

14. Apparatus as claimed in claim 13 further comprising means for configuring the configurable interfaces to represent either a network (NT) or terminal (TE) side of the network interface.

15. Apparatus as claimed in claim 14 wherein the network interface at each terminal is an ISDN interface.

16. Apparatus as claimed in claim 15 wherein the means for configuring the configurable interfaces comprises computer means disposed at respective ones of the terminals for executing predetermined configurations under software control.

17. Apparatus as claimed in claim 16 further comprising means for selectively testing the protocols of layer 2 and layer 3 relayed between the terminals and wherein the transport network is a packet switching network.

* * * * *